No. 774,840.

Patented November 15, 1904.

UNITED STATES PATENT OFFICE.

EDUARD GOGLER, OF PODGORZE, NEAR CRACOW, AUSTRIA-HUNGARY.

METHOD OF MAKING WHITE CEMENT.

SPECIFICATION forming part of Letters Patent No. 774,840, dated November 15, 1904.

Application filed January 22, 1904. Serial No. 190,223. (No specimens.)

*To all whom it may concern:*

Be it known that I, EDUARD GOGLER, a subject of the Emperor of Austria-Hungary, residing at Podgorze, near Cracow, in the Empire of Austria-Hungary, have invented a new and useful Method of Making White Cement, of which the following is a specification.

The hitherto-known methods of producing white or ordinary cement consist in making by the known wet or dry or semiwet process a raw cement mass from a mixture of lime, silicic acid, and clay in the proper proportion and either in burning or sometimes in heating this raw cement mass up to the melting-point in special ovens. In the former case a temperature of about 1,400° centigrade and in the latter case a temperature of about 2,000° centigrade is required. For this reason attempts have already been made in reducing this high temperature by a small addition of alkalies—for example, from one to three per cent. soda and potash—but it was only possible to reduce the temperature down to 1,200° centigrade at the utmost.

My invention relates to a method of producing white cement by melting a calcareo-silicious material and a material containing silicic acid, either raw or burned, with a greater addition of alkalies, lixiviating the molten product and drying the mass, so as to obtain at an essentially lower temperature a cement of white or ordinary color which is specially remarkable for its hardness and extreme stability in volume under water.

As already indicated, the raw materials for this process are lime, sand, silicic acid, or materials containing silicic acid, which may be either left raw or already burned; but in any case they should be as free as possible from iron combinations. If clays are disposable which contain no iron, they can also be used for the manufacture. However, in this case it will be advantageous to use such clays containing, on the one hand, the highest possible percentage of silicic acid, ($SiO_2$,) and, on the other hand, a very low percentage of aluminic oxid, ($Al_2O_3$,) as aluminic oxid is soluble in alkaline solutions. The said materials having been most finely ground and mixed in the proper proportion for the manufacture of cement, a quantity of carbonates of alkalies of from one to three times the weight of the silicates contained in the mixture, according to the degree of the fusibility of the mixture and to the melting temperature at disposal, is added to this mixture. The addition of so large a quantity of alkalies serves merely the purpose of dissolving the silicates by means of this flux—*i. e.*, for turning the insoluble silicic acid into its soluble condition. From the whole mixture a raw cement mass is then made by the known dry or wet or semiwet process, and this raw cement mass is molten in suitable ovens. When, for example, a raw cement mass containing sixty-five weight parts of caustic lime and thirty-five weight parts of arenaceous quartz is at disposal, then according to this method an addition of from thirty-five to one hundred and five weight parts of carbonates of alkalies is made. This weight of carbonates of alkalies is to be understood for the calcined state of the latter. However, also crystalline alkalies in the shape of oxids (such as caustic soda and caustic potash) or in the shape of concentrated lyes may be employed. For melting the raw cement mass the percentage of oxids is of essential importance, and therefore in composing the mixture if carbonates of alkalies are not employed in their calcined state care should be taken to always calculate the molecular weights of the oxids which are then turned into those of the carbonates of alkalies. The addition may be soda or potash alone or both mixed together in any proportion, regard being had to the fact that for a greater portion of potash the addition to the raw cement mass may be smaller, seeing that potash is a stronger alkali than soda. By means of this addition of carbonates of alkalies it is possible to cause the raw cement mass, consisting of caustic lime and arenaceous quartz, to melt at a temperature easily to be obtained, while without this large addition of alkalies it would be impossible to melt the raw cement mass even in the most powerful melting-furnace at disposal. The molten product obtained in the manner indicated above is then disintegrated or granulated by means of water and afterward lixiviated in boiling water until its percentage of alkalies is reduced to the amount allowable according to experience in hydraulic cements. Thereupon the mass is completely dried at a weak red heat and next ground most finely, when the desired cement of the pure white color and the remarkable strength and extreme stability in volume is obtained. Owing to the lack of argillaceous earth in the cement made of caustic lime and arenaceous quartz, this cement is particularly suitable for seaboard buildings.

When employing as raw stuffs caustic lime and arenaceous quartz and applying as a flux carbonate of soda, the formation of the cement takes place according to the formula:

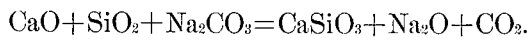
$$CaO + SiO_2 + Na_2CO_3 = CaSiO_3 + Na_2O + CO_2.$$

The calcium silicate—*i. e.*, the slag left after the lixiviation—forms the cement, while the protoxid of sodium in combination with the carbonic acid is dissolved as carbonate of soda in the water.

A raw-cement mass composed of seventy per cent. CaO and thirty per cent. $SiO_2H_2SiO_3$, molten with an addition of seventy weight parts of $Na_2CO_3$, according to this method furnishes after the lixiviation a cement consisting of 64.5 per cent. CaO, thirty per cent. $SiO_2$, and 5.5 per cent. $Na_2CO_3$.

Of course the lye obtained by the lixiviation of the molten product is again used for treating the following charges in order to reduce the expenses of the manufacture.

What I claim as my invention, and desire to secure by Letters Patent, is—

1. The herein-described method of making white cement, which consists in mixing in the proper proportion a material containing silicious lime with a material which contains sand, quartz or silicic acid, each as free as possible from iron combinations, adding a quantity of alkalies of from one to three times the weight of the silicates contained in the mixture, making from the whole mixture a raw cement mass, melting the raw cement mass, disintegrating or granulating the molten product, lixiviating the disintegrated or granulated mass in boiling water until its percentage of alkalies is reduced to the proper amount, completely drying the mass, and finely grinding it, substantially as set forth.

2. The herein-described method of making white cement, which consists in finely grinding a material containing silicious lime with a material which contains sand, quartz or silicic acid, each as free as possible from iron combinations, mixing these materials in the proper proportion with the addition of a quantity of carbonates of alkalies of from one to three times the weight of the silicates contained in the mixture, making from the whole mixture a raw cement mass, melting the raw cement mass, disintegrating or granulating the molten product, lixiviating the disintegrated or granulated mass in boiling water until its percentage of alkalies is reduced to the proper amount, completely drying the mass at a weak red heat, and finely grinding it, substantially as set forth.

3. The herein-described method of making white cement, which consists in mixing in the proper proportion lime and quartz-sand or pure silicic acid, both as free as possible from iron combinations, adding a quantity of carbonates of alkalies of from one to three times the weight of the silicates contained in the mixture, making from the whole mixture a raw cement mass, melting the raw cement mass, disintegrating or granulating the molten product, lixiviating the disintegrated or granulated mass in boiling water until its percentage of alkalies is reduced to the proper amount, completely drying the mass, and finely grinding it, substantially as set forth.

4. The herein-described method of making white cement, which consists in finely grinding lime and quartz-sand or pure silicic acid, both as free as possible from iron combinations, mixing these materials in the proper proportion with the addition of a quantity of carbonates of alkalies of from one to three times the weight of the silicate contained in the mixture, making from the whole mixture a raw cement mass, melting the raw cement mass, disintegrating or granulating the molten product, lixiviating the disintegrated or granulated mass in boiling water until its percentage of alkalies is reduced to the proper amount, completely drying the mass at a weak red heat, and finally grinding it, substantially as set forth.

5. The herein-described method of making white cement, which consists in finely grinding caustic lime and arenaceous quartz-sand or silicic acid as free as possible from iron combinations, mixing these materials in the proper proportion with the addition of a quantity of alkalies (carbonates of alkalies caustic soda or caustic potash or concentrated lyes of alkalies) of from one to three times the weight of the silicate contained in the mixture, making from the whole mixture a raw cement mass, melting the raw cement mass, disintegrating or granulating the molten product, lixiviating the disintegrated or granulated mass in boiling water until its percentage of alkalies is reduced to the proper amount, completely drying the mass at a weak red heat, and finely grinding it, substantially as set forth.

In testimony whereof I have signed my name to this specification in the presence of two subscribing witnesses.

EDUARD GOGLER.

Witnesses:
   MORIZ GROSSMANN,
   ADOLF GROSSMANN.